(12) United States Patent
Scherpa et al.

(10) Patent No.: US 9,277,024 B2
(45) Date of Patent: Mar. 1, 2016

(54) SUPPRESSING CONTENT OF A SOCIAL NETWORK

(71) Applicant: International Business Machines Corporation, Armonk, NY (US)

(72) Inventors: Josef Scherpa, Fort Collins, CO (US); Andrew Lewis Schirmer, Andover, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 361 days.

(21) Appl. No.: 13/720,252

(22) Filed: Dec. 19, 2012

(65) Prior Publication Data

US 2014/0172977 A1 Jun. 19, 2014

(51) Int. Cl.
*G06F 15/16* (2006.01)
*H04L 29/08* (2006.01)

(52) U.S. Cl.
CPC .................................. *H04L 67/2828* (2013.01)

(58) Field of Classification Search
USPC .......... 709/202, 204, 205, 206, 224, 225, 226
See application file for complete search history.

(56) References Cited

U.S. PATENT DOCUMENTS

| 8,001,194 | B1 * | 8/2011 | Dharmastala | 709/206 |
| 8,051,074 | B2 * | 11/2011 | Eom et al. | 707/722 |
| 2004/0017577 | A1 * | 1/2004 | Ostrover et al. | 358/1.8 |
| 2011/0040787 | A1 * | 2/2011 | Cierniak et al. | 707/770 |
| 2011/0041075 | A1 * | 2/2011 | Cierniak et al. | 715/745 |
| 2013/0125247 | A1 * | 5/2013 | Sprague et al. | 726/28 |
| 2013/0291105 | A1 * | 10/2013 | Yan | 726/22 |

OTHER PUBLICATIONS

Bob King, Wordpress plugin: Comment Rating, The Wealthy Netizen, Aug. 16, 2009.

* cited by examiner

*Primary Examiner* — Liangche A Wang
(74) *Attorney, Agent, or Firm* — Steven L. Nichols; Fabian VanCott

(57) ABSTRACT

A method of suppressing content of a social network, the method comprising monitoring for a number of gestures of rejection of content on the social network from a number of users, generating suppression data based on the gestures of rejection, receiving input from a first user among the number of users indicating that the suppression data is to be leveraged, and suppressing content based on the suppression data.

15 Claims, 2 Drawing Sheets

SUPPRESSING CONTENT OF A SOCIAL NETWORK

BACKGROUND

Users of a social network often share content with other users of the network. Different content may exist such as photos, news feeds, bookmarks, and websites, among others. This content may be posted or otherwise shared on the social network sites to those associated with the user. This may provide the user with a way to show support for, show an interest in, or promote awareness of the subject of the content. The total amount of content viewable on the social networking site by a user may depend on the number of other users the user has associated him/herself with as well as how much information is shared to the social group by those other users.

SUMMARY

According to one example, the present specification describes a method of suppressing content of a social network, the method comprising monitoring for a number of gestures of rejection of content on the social network from a number of users, generating suppression data based on the gestures of rejection, receiving input from a first user among the number of users indicating that the suppression data is to be leveraged, and suppressing content based on the suppression data.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

BRIEF DESCRIPTION OF THE SEVERAL VIEWS OF THE DRAWINGS

The accompanying drawings illustrate various examples of the principles described herein and are a part of the specification. The illustrated examples do not limit the scope of the claims.

DETAILED DESCRIPTION

Figure 1:
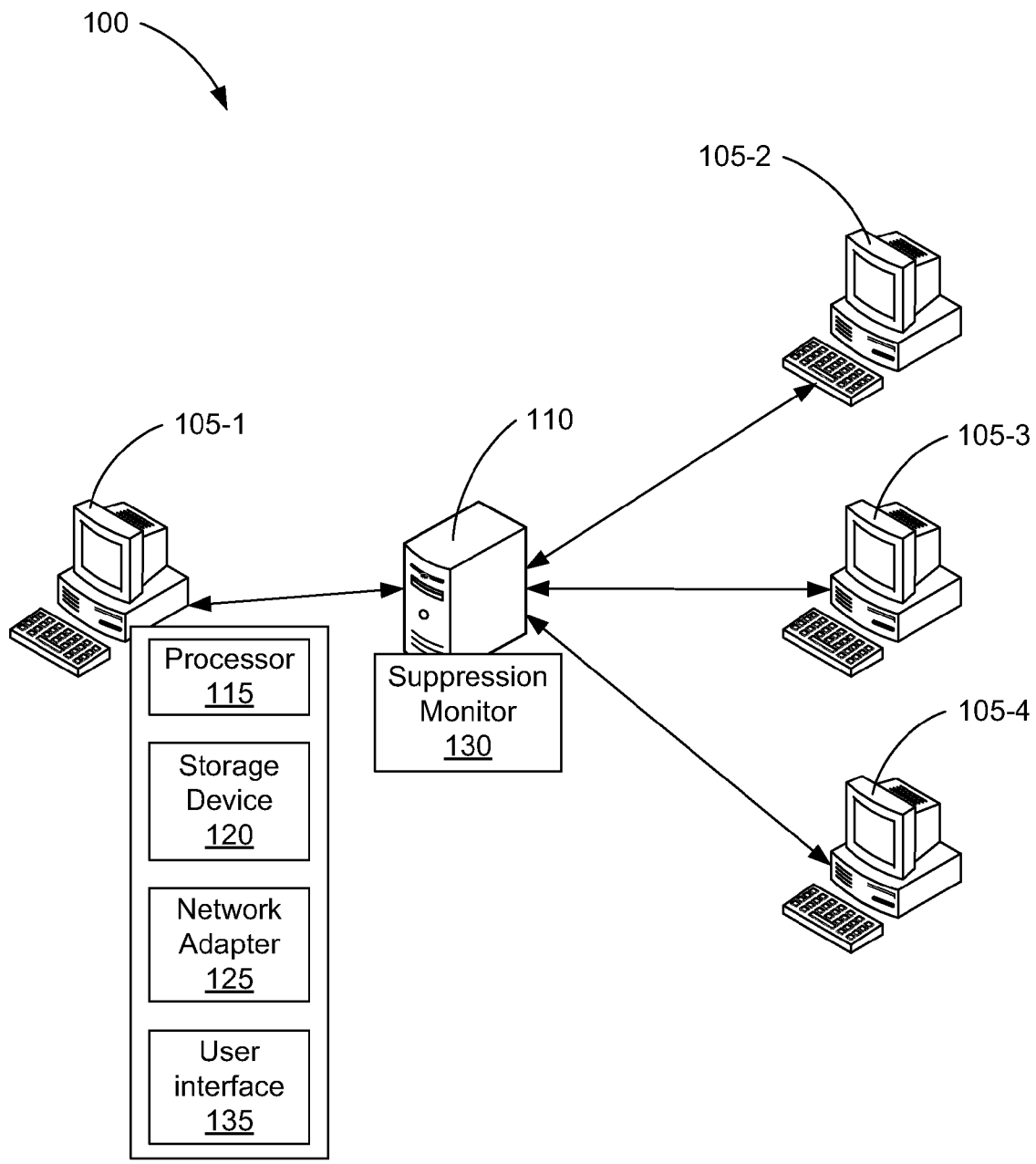
FIG. 1 is a block diagram showing a computer network which may be used in connection with a social network according to one example of the principles described herein.

Computer networks provide any number of persons with the ability to socialize over the network with others in a social group. Often these users look to share information over the computer network with others associated with that social network. This information may be uploaded to the social network site or typed out in blog, microblog, or forum format. As the number of users of a social network sites increase, the potential that all the information uploaded to the social network site being pertinent to each user individually may begin to decrease. Indeed, although a first user may be "friends" with or otherwise associated with a second user, any comments or content presented by a third user who is friends with the second user may not be interesting to the first user.

Any single user is, therefore, bombarded with an ever increasing amount of information presented via the social network site. The amount of information to be reviewed by any one user is further compounded by the fact that some individual users are members of more than one social networking site or group. The amount of time spent reviewing all the information and content presented to any one user through his/her data channels consequently increases over time and activity on the site.

Those persons who the user is associated with in the separate networking sites may have overlapping perspectives and interests. As a result, it may be more likely that the content that one user finds of more or less of value will also be of more or less value to other users in that network.

The present specification, therefore, describes a system and method of reducing the amount of unimportant information by taking advantage of the experiences of other in the user's behavior on the social network. Based on the consumption habits and behaviors of other users of the networking site, a single user may be able to have that unimportant content or "noise" filtered out such that the user may spend a minimal amount of time, if any at all, addressing the unimportant content. As other users "prune" out the noise, users interacting with the content on the social network may achieve time savings and more streamlined consumption of meaningful content.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

In the present specification and in the appended claims, the term "social network" is meant to be understood broadly as any online community where people with interests and goals can interact, make connections, and collaborate. The creation and maintenance of the online social network may be realized by any number of physical hardware devices used to create and online service, platform, or site. For example, the social network may be maintained by any number of computing devices interacting together forming a hardware network through which any number of users may interact. Some examples of social networking services may include Facebook®, Google+®, and Twitter®. Other examples and types of social networks exist and the present specification anticipates the use of the present system and method with those social networks.

Additionally, in the present specification and in the appended claims the term "noise" is meant to be understood broadly as any information that a user of the system deems to be unimportant. Noise may include any amount of content provided on a social network site.

Still further, in the present specification and in the appended claims the term "content" is meant to be understood broadly as any typed, attached, or computer generated information that is presented on a social network site. This content may include user posted comments or images and system generated announcements, among others. In a number of examples presented in the present specification, an amount of this content, whether human or machine generated, may be actively suppressed using the system and method as described herein.

Turing now to FIG. 1, a block diagram of a computer network (100) which may be used in connection with a social network is shown according to one example of the principles described herein. The computer network (100) may comprise a number of user devices (105-1, 105-2, 105-3, 105-4) and a social network server (110). Although FIG. 1, shows the computer network (100) using a central server (110) to allow individual users of the individual user devices (105-1, 105-2, 105-3, 105-4) to socialize, other types of architectures such as a distributed social network may be used. The present specification, therefore, contemplates the use of these other types of device networks.

The user devices (105-1, 105-2, 105-3, 105-4) may each comprise a processor (115), a storage device (120), and a network adapter (125). The processor (115) receives instructions from computer readable program code stored on the storage device (120). The computer readable program code may be used by the processor to at least establish a network connection with any number of other user devices (105-1, 105-2, 105-3, 105-4) and the social network server (110), accept and send input to the other user devices (105-1, 105-2, 105-3, 105-4) and the social network server (110), and otherwise accept instructions from a user of the user device (105-1, 105-2, 105-3, 105-4) to effect those actions engaged in while is user is accessing a social network online.

Although FIG. 1 shows that the user devices (105-1, 105-2, 105-3, 105-4) are desktop computers, the user devices (105-1, 105-2, 105-3, 105-4) may be any type of computing device capable of connecting to and communication with a computer network. The user devices (105-1, 105-2, 105-3, 105-4) may therefore include desktop computers, laptop computers, tablet devices, personal digital assistants, smartphones, networking devices, and servers, among others. Additionally, any number of user devices (105-1, 105-2, 105-3, 105-4) may be communicatively coupled to the network.

The storage device (120) may store data such as executable program code that is executed by the processor (115) or other processing devices. As will be discussed, the storage device (120) may specifically store a number of applications that the processor (115) executes to implement at least the functionality of the system and method described herein.

The storage device (120) may include various types of memory modules, including volatile and nonvolatile memory. For example, the data storage device (120) of the present example includes Random Access Memory (RAM), Read Only Memory (ROM), and Hard Disk Drive (HDD) memory. Many other types of memory may also be utilized, and the present specification contemplates the use of many varying type(s) of memory in the storage device (120) as may suit a particular application of the principles described herein. In certain examples, different types of memory in the storage device (120) may be used for different data storage needs. For example, in certain examples the processor (115) may boot from Read Only Memory (ROM), maintain nonvolatile storage in the Hard Disk Drive (HDD) memory, and execute program code stored in Random Access Memory (RAM).

The storage device (120) may comprise a computer readable medium or any combination of one or more computer readable mediums. For example, the data storage device (120) may be, but not limited to, a system, apparatus, or device implementing electronic, magnetic, optical, electromagnetic, infrared, or semiconductor devices or any suitable combination of the foregoing. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network adapter (125) included with the user devices (105-1, 105-2, 105-3, 105-4) may provide communication between the individual user devices (105-1, 105-2, 105-3, 105-4) and the social network server (110). As will be described below, the network adapter (125) may provide the user devices (105-1, 105-2, 105-3, 105-4) with the ability to uploaded and download content provided on a social network.

The network adapter (125) may facilitate a wired or wireless communication. In the example above where the user device (105-1, 105-2, 105-3, 105-4) is a smartphone, the network adapter (125) may facilitate the actions described herein using a wireless internet connection. Alternatively, the network adapter (125) may facilitate the actions described above using a cellular network connection. Still further, the network adapter (125) may facilitate the actions described herein using a number of other connection methods both wired and wireless such as a LAN line connection, an optical fiber line connection, a Bluetooth connection, and an Ethernet connection, among others.

The user devices (105-1, 105-2, 105-3, 105-4) may further comprise a user interface (135). The user interface (135) may be comprised of hardware or hardware and software that enables a user to interact with the system (100), any programs being executed by the processors on the user devices (105-1, 105-2, 105-3, 105-4), and the user devices (105-1, 105-2, 105-3, 105-4) themselves. In one example, a user may be able to delete or hide content presented on a social network through the user interface (135). In another example, a user may use the user interface (135) to select the various user preferences described herein. Specifically, as will be described later, a user may be allowed to determine which users among the number of users using the social network site to receive suppression data from so as to advantageously leverage that suppression data. Leveraging of the suppression data allows the user to see important content on the social networking site while the unimportant information is suppressed.

The system (100) may be used by a user in order to engage in activities associated with an online social network. Specifically, the user may be allowed to view content posted on the social network by other users of the various other user devices (105-1, 105-2, 105-3, 105-4). As described above, however, the amount of information included by the other users on the social networking site may be extensive. In order to help hide unimportant content from any given user, the social network server (110) may include a suppression monitor (130). The suppression monitor (130) may generally monitor all users' activity and determine which posts or content on the social networking site should be hid from any one user. This is done by determining which content on the social networking site other users had previously marked as undesirable or unimportant. In one example, a first user may take advantage of this indication by another user to automatically have that content suppressed or hidden from view on his or her user device (105-1, 105-2, 105-3, 105-4, 110). Hiding the information, may allow the first user to quickly glean content relevant to him or her in a relatively shorter amount of time. This reduces the overall amount of content presented to the first user leaving the relatively more important content to be consumed quicker. As a result, the first user's time is not wasted on less valuable information and the first user may have more time to be engage in other endeavors. Additionally, a user will be presented with the most important information first rather than getting overwhelmed in reviewing any of the information presented to him or her at any given time.

Although FIG. 1 shows that the suppression monitor is included with the social network server (110), in other examples the suppression monitor (130) may be located on any of the devices shown in FIG. 1 or included as a separate computing unit communicatively coupled to a number of the user devices (105-1, 105-2, 105-3, 105-4, 110). In one example, the suppression module (130) may exist as a plug-in application implemented on each of the user devices (105-1, 105-2, 105-3, 105-4, 110). In another example, the suppression module (130) may be comprised of a number of different modules that may exist on a number of user devices (105-1, 105-2, 105-3, 105-4, 110) and that may work in concert to achieve the functionality of the system (100) and the method (200) described herein.

Figure 2:
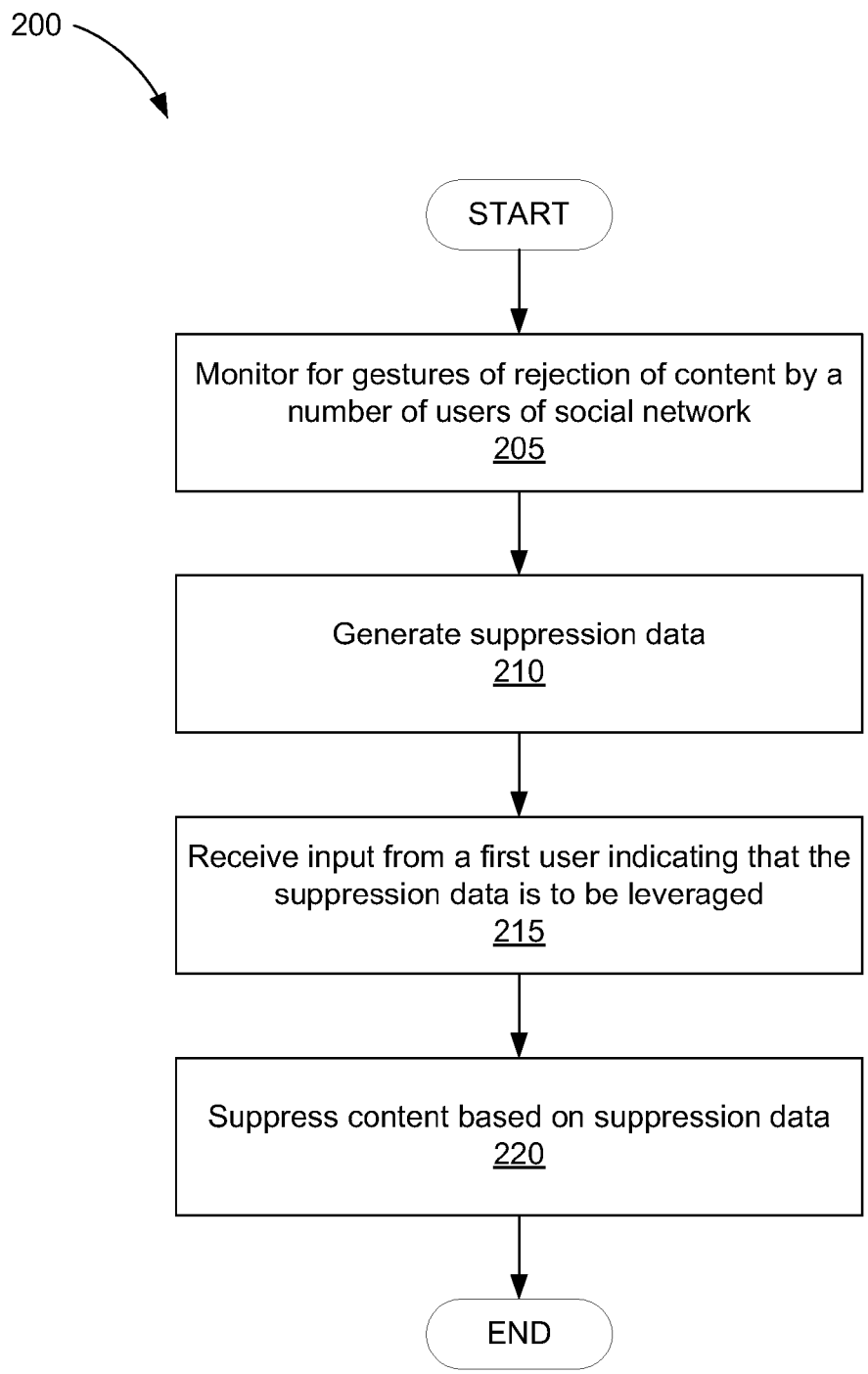
FIG. 2 is a flowchart showing a method of suppressing content viewed within a social network according to one example of principles described herein.

FIG. 2 is a flowchart showing a method of suppressing content viewed within a social network according to one example of principles described herein. The method (200) may begin with the suppression monitor (FIG. 1, 130) monitoring (205) for gestures of rejection of content by a number of users of the social network.

In one example, the suppression monitor (130) may detect explicit and implicit gestures engaged in by any given user in order to identify content within the social network site that may be of lower value to any other user. In one example, an implicit gesture may be the inaction of a user when presented with content on the social network site. For example, when a user is presented with some content on the social networking site and does not click on or otherwise view that content, the suppression monitor (FIG. 1, 130) may detect this, and determine that this implicit gesture is indicative of the fact that that user does not see that content or the subject of that content as containing worthwhile or important information.

In another example, the suppression monitor (FIG. 1, 130) may monitor (205) for explicit gestures of rejection of content by a number of users of the social network. The explicit gestures may include any actuation of a user interface device or use of an input device by a user to manipulate content on the users' social network site. Explicit gestures may result in the deletion or hiding of content on the social network site.

The method (200) may continue with the system (FIG. 1, 100) generating (210) suppression data. The suppression data may describe how, by whom, and what specific content was suppressed by a user. In one example, the suppression data may indicate which of the users of the social network site had suppressed the data. In this example, the suppression data may be tied to that user so that other users may utilize or otherwise leverage that suppression. Indeed, if the user who has suppressed specific data has a reputation for being able to read through and quickly hide or delete uninteresting content, associating the name of that user with that suppression data may be useful to a subsequent user of the system (FIG. 1, 100) looking to leverage that suppression data.

The suppression data may further describe how the content was suppressed. In one example, the suppression data may include data indicative of whether a user has explicitly suppressed content by, for example, selecting an option to hide or delete the content. In another example, the suppression data may include data indicative of whether or not the user had implicitly suppressed content by not viewing specific content or by not opening an article.

Some content of the social network site may be divided into various articles with titles indicating their subject matter. As such, the suppression data may include data indicating that the article was not opened and based on that information determines that the subject matter or the article itself was not important to the user. In examples where the content on the social network site is not divided into articles, the suppression data may still indicate time spent viewing a portion of specific content and determine, using a threshold time limit, whether the user had reviewed the content substantively enough to have that content be determined as unimportant or not. The time limit threshold may be based on an average amount of time it would take to read a number of words per minute and how many words were in the content.

The method (200) may continue with the system receiving (215) input from a user indicating that the suppression data is to be leveraged on his or her behalf. Here, a subsequent user who is viewing the content on the social networking site may take advantage of the suppression data generated (210) and choose to have an amount of the content hidden or deleted from view. In one example, a first user may indicate, via the user interface (FIG. 1, 135), that he or she would like to leverage the suppression data of a specific user. In another example, a first user may indicate, via the user interface (FIG. 1, 135), that he or she would like to leverage the suppression data of a group or number of users. In yet another example, a first user may indicate, via the user interface (FIG. 1, 135), that he or she would like to leverage average suppression data of all the users of the social networking site. These examples will now be described in more detail.

In one example a user may be presented, on the user interface (FIG. 1, 135), with a list of names of users of the social networking site. The user may then be allowed to select from the number of users any specific users from which the user would like to leverage any associated suppression data. Therefore, if a first user was to select the name of a second user on the user interface (FIG. 1, 135), when the user views the content of the social networking site, the user will then be able see all of the content except that content which was previously suppressed by the second user. The suppression of any content on behalf of the first user will therefore be based on the selection of a number of users and their accompanying suppression data. In one example, as the number of selected users increases, the amount of content presented to the first user may decrease such that the most important content is presented to the first user. The first user, having trusted the other users' determination as to what content is and is not important, will then be able to quickly review that important information without having to read as much, if any, unimportant content.

In another example, the user may choose generally a group of users among the number of users of the social networking site. Similar as described above, the suppression data of the group may be leveraged by the first user such that all of the content indicated as being suppressed by the group will also be suppressed on the first users user interface (FIG. 1, 135) of the user device (105-1, 105-2, 105-3, 105-4, 110). Again, the first user may take advantage of the group's determination as to what content is and is not important. This allows, for example, a member of a collaborative group to more quickly bring other members up to speed on a discussion or topic. This may prove very advantageous in situations where a new user has just been accepted into the collaborative group and should be informed of the most important information in the least amount of time.

In yet another example, the first user may choose to leverage an average of the suppression data generated by the suppression monitor (FIG. 1, 130). In this example, the suppression monitor (FIG. 1, 130) may receive a number of implicit or explicit gestures from a number of users indicating whether that content was suppressed or not. Based on that information, the suppression monitor (FIG. 1, 135) may further average out the suppression data such that if the average suppression data reaches a threshold level, the data will also be suppressed if the first user were to select that option.

The above examples allow a user to determine, with a desired specificity, which suppression data to leverage in order to view important content on the social networking site. In some social networking sites, all users may not necessarily have the same content to view as other users. This may be because, for example, a first user has associated him or her self with a number of other users who are not "friends" with a second user. That content similar to the first and second users may still be subject to suppression if, for example, the first user has explicitly or implicitly suppressed that similar content. In this case, if the second user has chosen to leverage the suppression data of the first user, that content which the first and second user have in common and which was suppressed by the first user will also be suppressed on the second user's user interface (FIG. 1, 135).

The system (FIG. 1, 100) may be even further flexible for the user such that the user may be allowed to select how much weight to give suppression data associated with a specific person. In this case, the user may decide that if a number of users have chosen to either suppress or not suppress the content, that the suppression data associated with certain users of that group may be weighted differently such that, although they had suppressed the content, the content is still viewable based upon the non-suppression of the others. Therefore, in this example, not only will the first user be allowed to select from which users to receive accompanying suppression data but also select how much weight a decision to suppress content by that user will affect the first users viewable content.

Other examples may exist where generally a preponderance of a number of people able to access specific content and which have indicated that the content is to be suppressed results in that content being suppressed on the first user's interface (FIG. 1, 135). In another example, the system (FIG. 1, 100) may be additive such that every user gets a score associated with them and the scores of all those users are added to determine whether the content should be suppressed or not. Other examples exist where the user is allowed to manipulate the consumption of the suppression data, and the present specification contemplates those alternatives.

As discussed above, once the system (FIG. 1, 100) has received (215) input from a first user indicating that the suppression data associated with any number of other users is to be leveraged, the system (FIG. 1, 100) then suppresses (220) that content based on the suppression data and the input sent by the first user. The suppression data may constantly be updated for the benefit of the first user such that all content that is suppressed by a user who the first user is leveraging suppression data from will continue to be suppressed. This may change when the first user indicates via the user interface (FIG. 1, 135) that he or she no longer wants to leverage that suppression data.

In one example, the suppression of content on the first user's user interface (FIG. 1, 135) may be such that the first user may still be able to view the suppressed data. In one example, the collection of suppressed data may be stored and retrieved by an assigned name using the user interface (FIG. 1, 135). In one example, a link or separate window may be provided to the first user such that he or she can quickly view the content that has been suppressed. This allows the content may be initially hidden from view, but may still be accessible. Therefore, after choosing to leverage certain suppression data associated with another user, the first user may still be able to review the content to see if the other user's determination of what is and is not important content coincides with the first user's determinations. If the first user determines that any one user's determinations do not coincide with his or her own determinations, the user may then decide to adjust the weight or otherwise change the settings associated with the suppression data generated from the activities of that user.

In another example, the suppressed content may still be viewable by the first user on the user interface (FIG. 1, 135) but may be made to be visually distinguishable from the unsuppressed content viable on the user interface (FIG. 1, 135). In one example, the suppressed content may be darkened such that it will indicate to the first user that the darkened content has been suppressed. This may allow the first user, in real time, to review all content at one time but skip over or scan over the darkened content. In yet another example, the user may be provided with the option to either continue to see suppressed content as darkened content or choose to have that content placed in a separate folder hidden from an initial view unless specifically accessed. Alternatively, the suppressed content may be distinguished via a color or size difference from the unsuppressed content. Again, this may allow a user, in real time, to review all content but skip over or scan over the suppressed colored or smaller/larger content.

Where specific content has been hidden in response to the first user choosing to leverage another user's suppression data, an override function may be provided. The override function may allow the first user to undo the suppression of specific content and allow that content to be viewed at least by the first user. In another example, by undoing the suppression of content, the first user may also be contributing to the same content not being hidden on other user's interfaces (FIG. 1, 135). For example, if and item of content has been hidden because 1% of the users of the social network site have chosen to hide it, the first user's action of unhiding the content may contribute to the content being unhidden for a number of other users. In this example, the system (FIG. 1, 100) may determine that a certain percentage of users have unhidden content before that content is unhidden and made viewable to any other users. If and when the content is unhidden due to another user's actions, any single user may be allowed to configure his or her system such that they may be allowed to choose whether and how to apply overrides to keep the content hidden.

The viewable content presented on any user's interface (FIG. 1, 135) may also be based on the amount of time any suppressed content has been suppressed. In one example, the first user may be allowed to choose to have content that has been suppressed be unsuppressed after a period of, for example, an hour. When the suppressed content has been unsuppressed, it may appear earlier or later chronologically on the interface (FIG. 1, 135) thereby allowing the user to review past articles or content without accessing this content in another window. The first user may also be relieved of having to skip over the previously suppressed content darkened content as described above. This further allows the user to, if willing, scroll back in time to view older content, but still be able to filter current content.

In another example, as the suppression monitor (FIG. 1, 130) is detecting whether users are implicitly or explicitly suppressing content through their gestures, the first user may be allowed to choose which of these gestures will be observed in suppressing content on their user interface (FIG. 1, 135). For example, the first user may wish to have content suppressed that was previously suppressed by another user using explicit gestures. In this case, any suppression of content by others using implicit gestures will not affect the content being viewed by the first user. Additionally, the first user may be allowed to choose how the explicit gestures will affect the content available to him or her. In this example, if another user were to delete content, the first user may be allowed to choose whether that content is also deleted or if it is simply hidden from his or her view or darkened in the current view as described above. Additionally, if another user were to hide content, the first user may be allowed to choose whether that content is also hidden or if it is to remain viewable.

In another aspect of the present system (FIG. 1, 100) the suppression monitor (130) may further determine what a user subsequently does with suppressed content. For example, if a user hides content within the social networking site, in one example, that content may still be presented later in a separate folder or window as described above. The suppression monitor (130) may further monitor whether that same user has subsequently deleted that content within the folder or window without any further review of it. The suppression data described above may then include this information and other users may further benefit from its implementation. For example, if previously hidden content was subsequently deleted, the suppression monitor (130) may determine that that content was unimportant enough to not include even within a suppressed content window for other users. In this case, the content will not be able to be viewed by other users leveraging the suppression data in their respective suppressed content.

The system (FIG. 1, 100) may further suppress content based on the subject of the content. Here, when another user suppresses content containing information on a certain subject, the suppression monitor (130) may use computer program code to analyze the subject of the content. Later, content containing that subject may be hidden from view by other users as well. This may allow users to see that content which is pertinent to a specific subject while hiding off-topic subjects. The system (FIG. 1, 100) may therefore interpolate patterns supplied by each of the users' suppression habits and extend those patterns to additional content items both in theirs and other's content.

One example of an environment in which the above described system and method may be implemented is in a stock trading forum. Trading stock may be, to some degree, based upon user perception of the value of the stock presented by others. In some cases, various users may be able to provide productive commenting on whether a certain stock will do well in the market or not. Other users may simply provide opinions which may or may not be valued by the rest of the users on the forum. Even still, some comments presented on the forum may be simple bickering as to the viability of the information. Here, the system provides for a user to select specific persons to whom he or she has previously noted as being able to see through all the opinionated comments and suppress that information. Leveraging that person's suppression data may allow a stock trader to quickly decide personally which content to read over and consume thereby potentially giving him or her the advantage of, at least, not having to sift through content that would otherwise not be as interesting, important, or influential in a decision to purchase stock.

The above described method may be implemented on a computing device using a computer program product. The computer program product may, therefore, comprise a computer readable storage medium that comprises computer usable program code embodied therewith that, when executed by the processor (FIG. 1, 115), implements at least the functionality of the system and method described herein. Specifically, the computer usable program code may comprise computer usable program code to, when executed by the processor (FIG. 1, 115), monitor (FIG. 2, 205) for gestures of rejection of content by a number of users of the social network. The computer usable program code may further comprise computer usable program code to, when executed by the processor (FIG. 1, 115), generate (FIG. 2, 210) suppression data. Even further, the computer usable program code may comprise computer usable program code to, when executed by the processor (FIG. 1, 115), receive (FIG. 2, 215) input from a user indicating that the suppression data is to be leveraged on his or her behalf. Still further, the computer usable program code may comprise computer usable program code to, when executed by the processor (FIG. 1, 115), suppress (FIG. 2, 220) that content based on the suppression data and the preferences selected by the first user.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (FIG. 1, 115) of the computer devices (FIG. 1, 105-1, 105-2, 105-3, 105-4, 110) or other programmable data processing apparatus, implement the functions or acts specified in the flowchart and/or block diagram block or blocks. In one example, the computer usable program code may be embodied within a computer readable storage medium; the computer readable storage medium being part of the computer program product.

The specification and figures describe a system and method for suppressing content provided on a social network site. This system may have a number of advantages, including providing a user of a social networking site to utilize suppression content generated through other users' actions to suppress unimportant content. Further, the system may provide for a user to specifically determine what suppression data to use to suppress unimportant content. Even further, a user of the system may further choose how the suppression data will affect the viewable content on a user interface while accessing the social networking site. Through this, the user is able to address the most important content available on the social networking site without spending time viewing content that has been previously deemed as unimportant.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of suppressing content of a social network, the method comprising:
with a processor of a suppression monitoring computing device:
monitoring for a number of gestures of rejection of content and deletion of rejected content on the social network from each of a plurality of users of the social network;
generating individualized suppression data associated with each of the users of the social network based on the gestures of rejection and deletion of rejected content by each of the individual users of the social network, the suppression data comprising content on the social network rejected and deleted by each of the individual users;
receiving input from a first computing device associated with a first user of the social network among a number of computing devices indicating that suppression data associated with a second user is to be leveraged; and
suppressing content based on the suppression data associated with the second user when input from the first computing device indicates the suppression data associated with the second user is to be leveraged;
wherein suppressing content based on suppressed data further comprises rendering suppressed content viewable at the first computing device but visually distinguishable by a user of the first computing device from any unsuppressed content.

2. The method of claim 1, in which visually distinguishing the suppressed content form the unsuppressed content comprises distinguishing the suppressed content from the unsuppressed content by a color difference, a size difference, or combinations thereof.

3. The method of claim 1, in which suppressing content based on suppressed data further comprises removing suppressed content from the view of a user of the first computing device and placing the suppressed data in a data storage device accessible to the user.

4. The method of claim 1, in which monitoring for a number of gestures of rejection of content on the social network further comprises monitoring whether the rejection of content amounts to a deletion or hiding of the content.

5. The method of claim 1, in which receiving input from the first computing device among the number of computing devices indicating that the suppression data associated with the second user is to be leveraged further comprises receiving:
an indication from the first computing device of specific suppression data associated with a group of users among a number of users is to be leveraged;
an indication from the first computing device of specific suppression data associated with all of the users of the number of users is to be leveraged; or
combinations thereof.

6. A system for suppressing content within a social network, the system comprising:
a suppression monitor communicatively coupled to a computer network, the computer network comprising a number of user devices; and
a processor communicatively coupled to the suppression monitor to:
monitor for gestures of rejection of content on the social network by individual users of the social network, wherein the gesture of rejection of content comprise implicit and explicit acts by the individual users of the social network;
generate suppression data based on those gestures of the individual users of the social network, the suppression data describing, for each individual user, what specific content is being rejected and how the content is being rejected, either implicitly or explicitly; and
suppress content on the social network accessed by a first user device of the number of user devices based on the suppression data upon receiving instructions from the first user device indicating that the suppression data is to be leveraged on the social network accessed by the first user device;
wherein the instructions from the first user device further indicates that specific suppression data associated with a specific user of the number of users of the social network is to be leveraged; and
wherein suppressing content based on suppressed data further comprises rendering suppressed content viewable at the first user device but visually distinguishable by a user of the first user device from any unsuppressed content.

7. The system of claim 6, in which receiving input from the first user device among the number of users indicating that the suppression data is to be leveraged further comprises receiving:
an indication from the first user device of specific suppression data associated with a group of users devices among a number of users devices is to be leveraged;
an indication from the first user device of specific suppression data associated with all of the user devices of the number of user devices is to be leveraged; or
combinations thereof.

8. The system of claim 6, in which visually distinguishing the suppressed content from the unsuppressed content comprises distinguishing the suppressed content from the unsuppressed content by a color difference, a size difference, or combinations thereof.

9. The system of claim 6, in which the processor suppressing content based on suppressed data further comprises removing suppressed content from the view of a user of a user device and placing the suppressed data in a data storage device accessible to the user.

10. The system of claim 6, in which monitoring for gestures of rejection of content on the social network further comprises monitoring whether the rejection of content amounts to a deletion or hiding of the content.

11. The system of claim 6, in which monitoring for a number of gestures of rejection of content on the social network further comprises monitoring for a subsequent deletion of any suppressed data.

12. The system of claim 11, in which if a subsequent deletion of any suppressed data is detected, the deleted content is also deleted from view of a user of the first user device during the suppression of the content based on suppressed data.

13. A computer program product for suppressing content provided on a social network site, the computer program product comprising:
 a computer readable storage medium comprising computer usable program code embodied therewith, the computer usable program code to, when executed by a processor:
  monitor for a number of implicit and explicit gestures of rejection of content and deletion of content on the social network from a number of users of the social network;
  generate individualized suppression data based on the gestures of rejection and the deletion of rejected content associated with each of the number of users, the individualized suppression data describing how each of the number of users delete and reject content;
  receive input from a first user device among the number of user devices accessing the social network site indicating that the suppression data is to be leveraged by the first user device on the social network site, the input comprising an indication of specific suppression data associated with a specific user among a number of users is to be leveraged; and
  suppress content based on the suppression data;
  in which deletion of rejected content in the number of computing devices causes the content to be deleted from view on the first computing device; and
  in which the computer usable program code to, when executed by a processor, suppress content based on the suppression data further comprises computer program code to render the suppressed content viewable to the user but visually distinguishable from any unsuppressed content.

14. The computer program product of claim 13, in which the input further comprises:
 an indication from the first user of specific suppression data associated with a group of users among a number of users is to be leveraged;
 an indication from the first user of specific suppression data associated with all of the users of the number of users is to be leveraged; or
 combinations thereof.

15. The computer program product of claim 13, in which visually distinguishing the suppressed content form the unsuppressed content comprises distinguishing the suppressed content from the unsuppressed content by a color difference, a size difference, or combinations thereof.

* * * * *